(12) United States Patent
Khadilkar et al.

(10) Patent No.: US 10,202,933 B2
(45) Date of Patent: Feb. 12, 2019

(54) COMBINED OIL FILTER AND RESTRICTOR ASSEMBLY

(71) Applicant: Ford Global Technologies, LLC, Dearborn, MI (US)

(72) Inventors: Prasad Shrikant Khadilkar, Romford (GB); James Martin Oates, Chelmsford (GB); Matt Haigh, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 15/188,714

(22) Filed: Jun. 21, 2016

(65) Prior Publication Data

US 2017/0002703 A1 Jan. 5, 2017

(30) Foreign Application Priority Data

Jul. 1, 2015 (GB) .................................. 1511547.0

(51) Int. Cl.
*F01M 11/03* (2006.01)
*F01L 1/24* (2006.01)
(Continued)

(52) U.S. Cl.
CPC .................................... *F02F 1/20* (2013.01);
*F01L 1/24* (2013.01); *F01M 1/10* (2013.01);
*F01M 1/12* (2013.01);
(Continued)

(58) Field of Classification Search
CPC .... F02F 1/20; F01M 1/10; F01M 1/12; F01M 2001/1028; F01M 2001/1057; F01L 1/24;
(Continued)

(56) References Cited

U.S. PATENT DOCUMENTS 4,100,894 A * 7/1978 Tamura .................... F01N 3/22
123/406.69
5,797,363 A 8/1998 Nakamura
(Continued)

FOREIGN PATENT DOCUMENTS

GB 2112896 A 7/1983
GB 2318307 A 4/1998
(Continued)

OTHER PUBLICATIONS

Examination Report of Great Britain Application No. 1511547.0, dated Dec. 15, 2015, 6 pages, United Kingdom Intellectual Property Office.

*Primary Examiner* — Madeline Gonzalez
(74) *Attorney, Agent, or Firm* — Julia Voutyras; McCoy Russell LLP (57) ABSTRACT

A combined oil filter and restrictor assembly is disclosed having an oil flow restrictor interposed between first and second filters so that, irrespective of the direction of oil flow through the restrictor, debris cannot enter a small diameter bore 32 in a body of the restrictor thereby reducing the likelihood of restrictor blockage. The combined oil filter and restrictor assembly includes a metal threaded member that enables the combined oil filter and restrictor assembly to be easily and quickly assembled to or removed from a component such as a cylinder head of a variable displacement engine. The combined oil filter and restrictor assembly can be used to provide a restricted flow of oil from oil supply passages to signal oil passages used for controlling the operation of deactivatable hydraulic lash adjusters so as to purge the signal oil passages when the deactivatable hydraulic lash adjusters are not deactivated.

15 Claims, 7 Drawing Sheets

(51) Int. Cl.
*F02F 1/20* (2006.01)
*F01M 1/10* (2006.01)
*F01M 1/12* (2006.01)
*B01D 35/00* (2006.01)
*F01L 1/047* (2006.01)
*F01L 13/00* (2006.01)

(52) U.S. Cl.
CPC ............... *F01L 2001/0476* (2013.01); *F01L 2001/2444* (2013.01); *F01L 2013/001* (2013.01); *F01L 2101/00* (2013.01); *F01L 2800/00* (2013.01); *F01L 2810/02* (2013.01); *F01L 2820/01* (2013.01); *F01M 2001/1028* (2013.01); *F01M 2001/1057* (2013.01); *F16N 2270/22* (2013.01)

(58) Field of Classification Search
CPC ......... F01L 2013/001; F01L 2001/0476; F01L 2820/01; F01L 2800/00; F01L 2101/00; F01L 2810/02; F01L 2001/2444; F16N 2270/22
USPC .............. 210/456, 167.02, 167.04, 171, 439; 123/90.16, 90.12
See application file for complete search history.

(56) References Cited

U.S. PATENT DOCUMENTS

| | | |
|---|---|---|
| 6,484,680 B2 | 11/2002 | Lunsford |
| 6,557,518 B1 | 5/2003 | Albertson et al. |
| 6,729,284 B2 | 5/2004 | Lunsford |
| 6,938,873 B2 | 9/2005 | Fischer |
| 7,040,265 B2 | 5/2006 | Falkowski et al. |
| 7,455,040 B2 | 11/2008 | Hendriksma et al. |
| 7,832,232 B2 * | 11/2010 | Wilson .................. F25B 41/067 62/324.6 |
| 2002/0124819 A1 * | 9/2002 | Lunsford .................. F01L 1/34 123/90.15 |
| 2006/0242957 A1 | 11/2006 | Sakai et al. |
| 2008/0035085 A1 | 2/2008 | Hendriksma |

FOREIGN PATENT DOCUMENTS

| | | |
|---|---|---|
| JP | H11324635 A | 11/1999 |
| WO | 0111200 A1 | 2/2001 |

* cited by examiner

COMBINED OIL FILTER AND RESTRICTOR ASSEMBLY

CROSS REFERENCE TO RELATED APPLICATION

This application claims priority to Great Britain Patent Application No. 1511547.0, filed Jul. 1, 2015, entitled "A COMBINED OIL FILTER AND RESTRICTOR ASSEMBLY", the entire contents of which are hereby incorporated by reference for all purposes.

FIELD

This present application relates to an apparatus for restricting the flow of oil through an oil passage and, in particular, to an apparatus having an oil filter and oil flow restrictor.

BACKGROUND/SUMMARY

It is known from, for example U.S. Pat. No. 6,557,518, to provide an oil restriction in oil control passages used to supply oil to deactivatable hydraulic lash adjusters in order to purge the control passages of gaseous vapor so that proper operation of the deactivation mechanisms is available when needed.

It is a problem with such an arrangement that the small size of the oil restriction can lead to blockage of the passage if any debris enters the restriction. It is a further problem associated with the prior art that such a restriction is difficult to clear if such a blockage does occur. Said problems have been recognized by the inventors herein.

It is further known from, for example U.S. Pat. No. 6,484,680, to provide a restrictor and filter assembly for use with a variable cam timing unit of an engine. The restrictor and filter assembly is press fitted into one of the oil passages in the engine and so is not easy to remove should the filter(s) become blocked. In addition, the restrictor and filter assembly only filters the oil entering the restrictor from one side and so is not suitable for use in situations where there is bidirectional flow through the restrictor.

One example approach to address these issues recognized by the inventors may include a combined oil filter and restrictor assembly that is easy to fit or remove and which provides filtration of the oil flowing through an oil restrictor irrespective of the direction of the oil flow.

According to a first aspect of the present application there is provided a combined oil filter and restrictor assembly comprising a filter and restrictor unit and a metal threaded member for sealingly retaining the filter and restrictor unit in position, wherein the filter and restrictor unit comprises a tubular body having a cylindrical side wall defining at least one primary oil access port located in the cylindrical side wall at a position spaced away from a first end of the tubular body, an oil flow restrictor located in the primary bore, a first filter located between a first end of the oil flow restrictor and the at least one primary oil access port and a second filter located between a second oil access port and a second end of the flow restrictor such that the oil flow restrictor is interposed between the first and second oil filters.

The oil flow restrictor may comprise a restrictor body defining a small diameter bore and the restrictor body is located in a primary bore defined by the cylindrical wall of the tubular body.

The second oil filter may be secured in position by the restrictor body.

An end portion of the tubular body may be engaged with a bore in an end portion of the threaded member so as to attach the tubular body to the threaded member.

The tubular body may be made from a plastics material.

The threaded member may have a head portion and a threaded body portion separated from the head portion by a circumferential groove for accommodating, in use, a resilient seal.

The head portion and a bore in a component with which the threaded member is threadingly engaged in use.

The head portion may have a drive means for use in securing the combined oil filter and restrictor assembly in position.

The first oil filter may comprise a cylindrical filter element positioned within the tubular body so as to overly the at least one primary oil access port.

According to a second aspect of the present application there is provided an assembly comprising a structural metal component and a combined oil filter and restrictor assembly constructed in accordance with said first aspect of the present application, the structural metal component defining at least two oil passages and a threaded cross bore joining a first oil passage of the at least two oil passages to a second one of the at least two oil passages, the metal threaded member of the combined oil filter and restrictor assembly is threadingly engaged with the threaded cross bore, the first oil passage is arranged to be in fluid communication with the at least one primary oil access port of the combined oil filter and restrictor assembly and the at least one second oil passage is arranged to be in fluid communication with the second oil access port of the combined oil filter and restrictor assembly.

The threaded cross bore may include a tapered portion for cooperation with the frusto-conical surface on the head portion of the threaded member so as to form a seal therebetween.

The tubular body may have at least one external circumferential rib thereon for sealing engagement with the threaded cross bore in the metal component.

The structural metal component may be a cylinder head of an engine.

According to a third aspect of the present application there is provided a variable displacement engine having at least one deactivatable cylinder, a cylinder head forming the structural metal component of an assembly constructed in accordance with said second aspect of the present application and at least one deactivatable hydraulic lash adjuster associated with a valve supported by the cylinder head wherein, when all of the cylinders of the engine are active, the combined oil filter and restrictor assembly permits a restricted purge flow of oil to flow from an oil supply passage for the at least one deactivatable hydraulic lash adjuster to a signal oil passage for the at least one deactivatable hydraulic lash adjuster so as to purge the signal oil passage.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present application will now be described by way of example with reference to the accompanying drawing of which:

FIG. 4b is an enlarged view in the region Ra on FIG. 4a;

FIG. 5b is an enlarged view in the region Rb on FIG. 5a;

DETAILED DESCRIPTION

Figure 1:
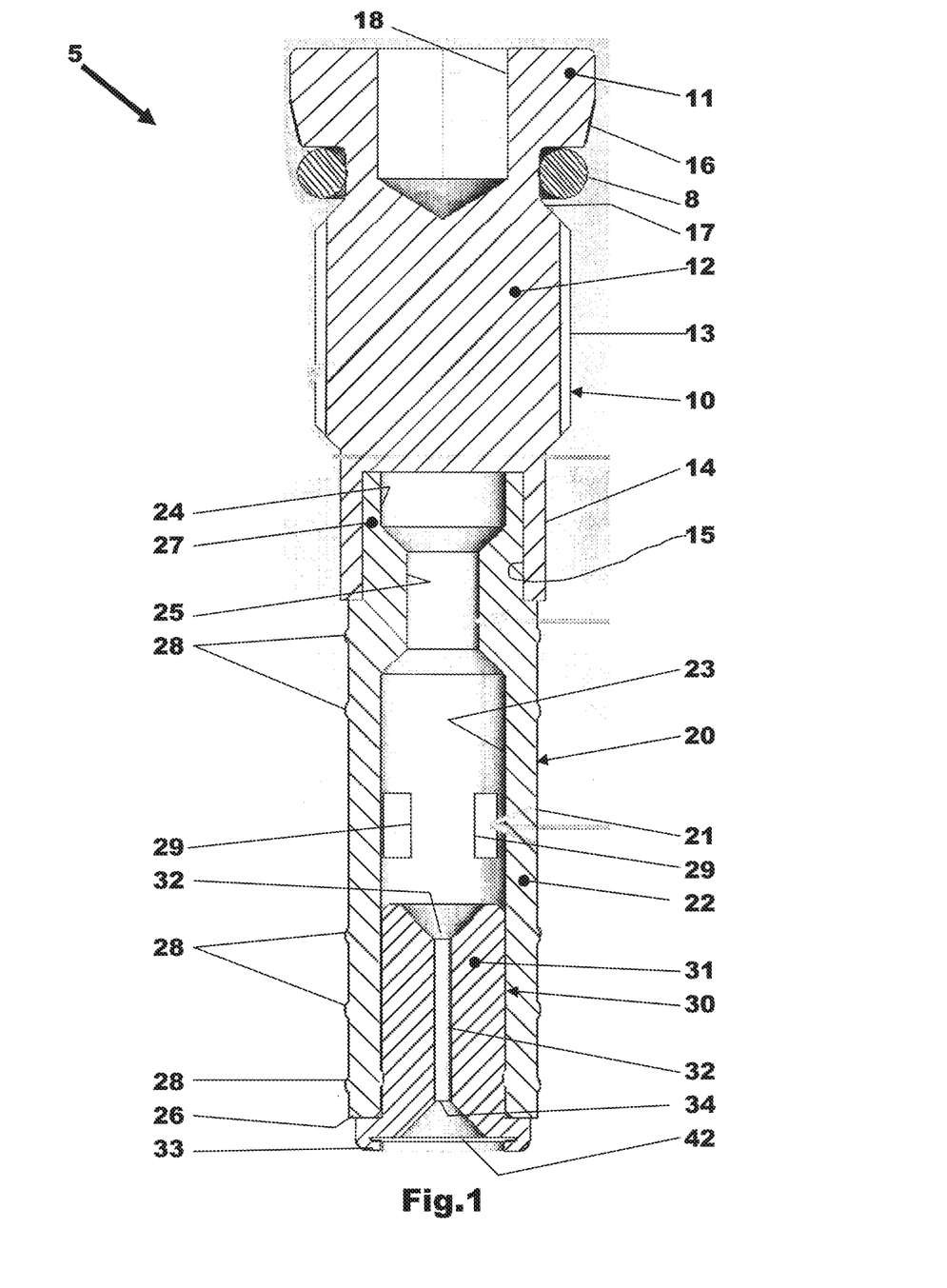
FIG. 1 is a cross-section through a combined oil filter and restrictor assembly according to a first aspect of the present application with a first oil filter removed.
Figure 2:
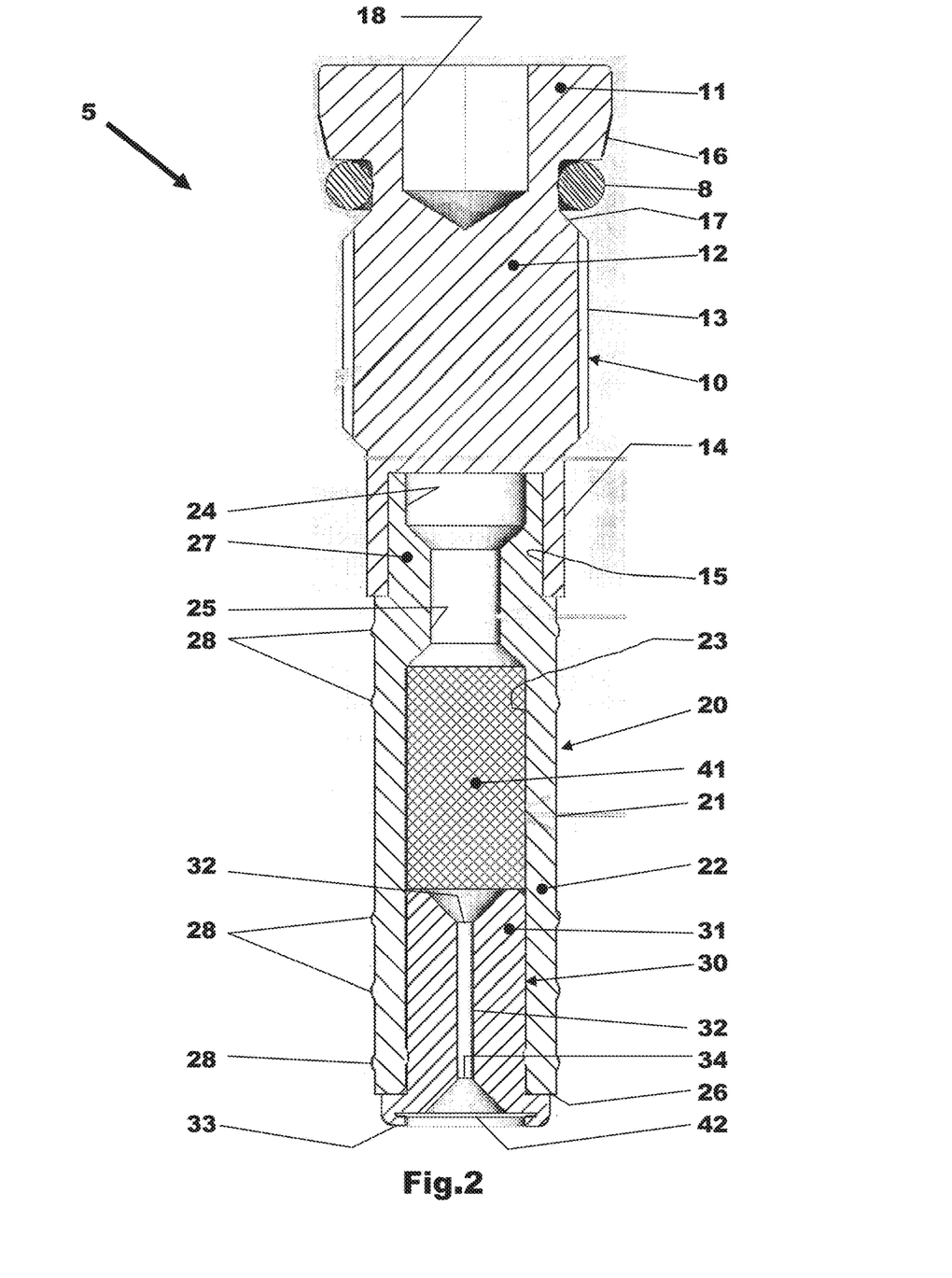
FIG. 2 is a cross-section through the combined oil filter and restrictor assembly shown in FIG. 1 with the first oil filter in position.

With particular reference to FIGS. 1 and 2 there is shown a combined oil filter and restrictor assembly 5.

The combined oil filter and restrictor assembly 5 comprises a filter and restrictor unit 20 and a metal threaded member 10 for sealingly retaining the filter and restrictor unit 20 in position.

The filter and restrictor unit 20 comprises a plastics tubular body 21 having a cylindrical side wall 22 defining primary, secondary and tertiary bores 23, 24, 25 respectively.

Two circumferentially spaced apart primary oil access ports 29 are located in the cylindrical side wall 22 of the tubular body 21 spaced away from a first end 26 of the tubular body 21. It will be appreciated that more or less oil primary oil access ports could be provided.

At a second end of the tubular body 21 there is provided an end portion 27 that is engaged with a bore 15 in a tubular end portion 14 of the threaded member 10 so as to attach the tubular body 21 to the threaded member 10.

The tubular body 21 has a number of circumferential ribs 28 formed on an outer surface of the cylindrical side wall 22. In the case of the embodiment shown there are three ribs 28 located between the first end 26 of the tubular body 21 and the two primary oil access ports 29 and two ribs located between the second end portion 27 and the two primary oil access ports 29. The ribs 28 are sized so as to sealingly engage with a bore in a component with which the combined oil filter and restrictor assembly 5 is engaged in use so as to prevent or restrict oil leaking from the region of the two primary oil access ports 29 towards either the first end 26 of the tubular body 21 or towards the second end portion 27 of the tubular body 21. It will be appreciated that instead of ribs 28, the tubular body 21 could have a smooth outer surface that forms an interference fit in the bore of the component to prevent leakage.

An oil flow restrictor 30 is located in the primary bore 23. The oil flow restrictor 30 comprises an aluminum restrictor body 31 defining a small diameter bore 32 which in this case is a 500 micron (0.5 mm) diameter bore. The restrictor body 31 is located in a primary bore 23 defined by the cylindrical wall 22 of the tubular body 21 and is molded in situ during manufacture of the tubular body 21.

It will be appreciated that an orifice could be used instead of a small diameter bore and that the present application is not limited to a restrictor having a small diameter bore. However, a restrictor having a long bore and a large length to diameter ratio is advantageous as it promotes laminar flow through the restrictor.

A first oil filter 41 is located between a first end 32 of the oil flow restrictor bore 32 and the primary oil access ports 29 and a second oil filter 42 is located between a second oil access port 33 and a second end 34 of the flow restrictor bore 32 such that the oil flow restrictor bore 32 is interposed between the first and second oil filters 41 and 42. The second oil access port 33 is defined in the case of this example by a swaged over end of the restrictor body 31 that holds the second oil filter 42 in position.

The first oil filter 41 is a cylindrical mesh filter element to provide radial filtration of oil entering the oil flow restrictor bore 32 from outside the tubular body 21 via the two primary oil access ports 29. That is to say, the cylindrical filter element 41 is positioned within the tubular body 21 so as to overly the two primary oil access ports 29.

The external diameter of the first oil filter 41 is substantially equal to the diameter of the primary bore 23 of the tubular body 21 so that it is a push fit therein.

The second oil filter 42 is a disc mesh filter to provide axial filtration of the oil entering the oil flow restrictor bore 32 from the second oil access port 33.

The mesh size of both of the mesh filters 41, 42 is finer than the diameter of the oil flow restrictor bore 32. That is to say, in this case, the first and second oil filters 41 and 42 both have a mesh size less than 500 microns (0.5 mm).

The secondary and tertiary bores 24 and 25 are provided to enable the tubular body 21 to be extracted from the bore with which it is engaged in use in the event that the metal threaded member 10 becomes detached from the second end portion 27 of the tubular member 21 during removal of the combined oil filter and restrictor assembly 5. In the case of such detachment a self tapping extractor having a self tapping screw diameter substantially equal to the diameter of the secondary bore 24 is screwed into the tubular member 21 to enable it to be removed. The diameter of the tertiary bore 25 is smaller than the diameter of the secondary bore 24 and so the threaded engagement of the self tapping extractor with the tertiary bore 25 provides additional plastic material for a screw part of the self tapping extractor to grip.

The metal threaded member 10 is in this case made from steel and has a head portion 11, a threaded body portion 12 and the tubular end portion 14.

The threaded body portion 12 is interposed between the head portion 11 and the tubular end portion 14 of the threaded member 10.

The threaded body portion 12 is separated from the head portion 11 by a circumferential groove 17 for accommodating in use a resilient seal such as an 'O' ring 8. The 'O' ring forms a primary seal between the threaded member 10 and a bore in a component with which the threaded member 10 is engaged in use.

The threaded body portion 12 has an external screw thread 13 formed thereon for engagement with a complementary thread formed in a component to which the combined oil filter and restrictor assembly 5 is fitted in use.

The head portion 11 has a frusto-conical surface 16 thereon providing a secondary seal between the head portion 11 and the bore in the component with which the threaded member 10 is threadingly engaged in use.

The head portion 11 has a drive means 18 for use in securing the combined oil filter and restrictor assembly 5 in position. In this case the drive means is a female drive means in the form of a hexagonal recess 18 that can be engaged by a complementary male tool for rotating the combined oil filter and restrictor assembly 5 so as to allow it to be screwed into or out of engagement with the component to which it is fitted. One of the advantages of the present application is that conventional tools both manual and power can be used to quickly install or remove the combined oil filter and restrictor assembly 5. It will be appreciated that the shape of the recess need not be hexagonal and that other drive means could alternatively be incorporated into the head such as, for example and without limitation, a spline drive. It will also be appreciated that the drive means could be a male drive means rather that a female drive means.

The tubular body 21 is in this case press fitted into the bore 15 in the tubular end portion 14 of the threaded member 10 so as to secure the head portion 11 and the tubular member 20 together.

The positioning of the first and second oil filters 41 and 42 is such that, irrespective of the direction of flow of oil through the restrictor bore 32 in use, the oil must flow through one of the first and second filters 41 and 42 before passing through the restrictor bore 32. This ensures that no debris large enough to block the restrictor bore 32 can enter the restrictor bore 32 thereby reducing the risk of blockage of the restrictor bore 32.

In the event that one of the first and second oil filters 41 and 42 becomes partially blocked it is a simple and quick operation to remove the combined oil filter and restrictor assembly 5 and to either clean the respective oil filter 41, 42 or replace the combined oil filter and restrictor assembly 5.

It is a further advantage of the present application that only mechanical seals are required to seal the combined oil filter and restrictor assembly 5 in position no liquid or non-setting sealant is required.

With particular reference to FIGS. 3 to 8 an exemplary use of such a combined oil filter and restrictor assembly will now be described.

Figure 8:
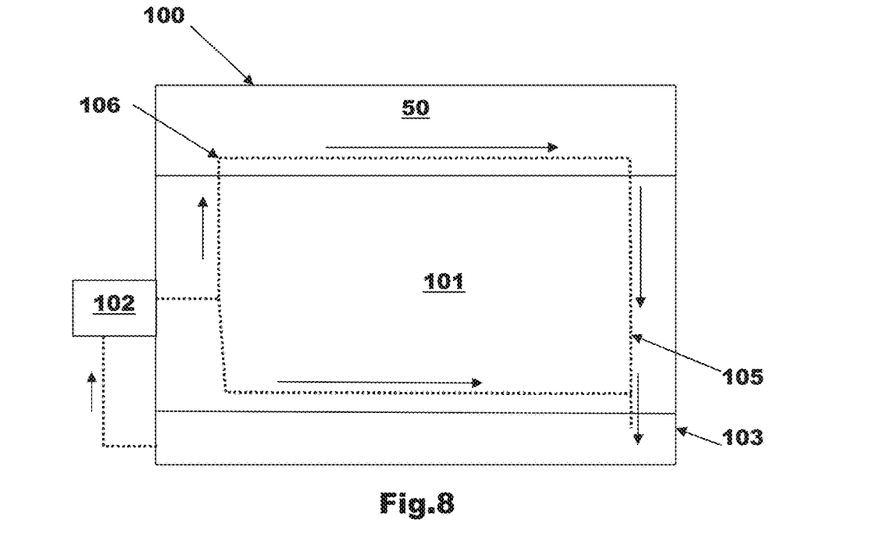
FIG. 8 is a schematic diagram of a variable displacement engine constructed in accordance with a third aspect of the present application having a cylinder head constructed in accordance with the second aspect of the present application showing the flow of oil through the engine.

A three cylinder variable displacement engine 100 having four valves per cylinder comprises a cylinder head 50, a cylinder block 101 and a sump 103. Oil is circulated through the cylinder block 101 by a pump 102 via a number of internal oil passages 105 and returns to the sump 103 as is well known in the art.

A direct oil feed 106 delivers oil from one of the oil passages 105 in the cylinder block 101 to the cylinder head 50 via a non return valve (NRV).

The oil supplied to the cylinder head 50 is used for lubricating a number of camshaft bearings (Cam Bearing) via oil feed passages 63 and for controlling a variable cam timing unit (not shown) via VCT feed in cam oil feeds 64a, 64b and to twelve hydraulic lash adjusters D1, D2, D3, D4, H1, H2, H3, H4, H5, H6, H7, H8.

The hydraulic lash adjusters D1, D2 H1, H2, H3 and H4 are associated with exhaust valves of the engine 100 and the hydraulic lash adjusters D3, D4, H5, H6, H7 and H8 are associated with inlet valves of the engine 100.

A first deactivatable cylinder of the engine 100 has a first exhaust valve (not shown) operated by the hydraulic lash adjuster D1, a second exhaust valve (not shown) operated by the hydraulic lash adjuster D2, a first inlet valve (not shown) operated by the hydraulic lash adjuster D3 and a second inlet valve (not shown) operated by the hydraulic lash adjuster D4. The hydraulic lash adjusters D1, D2, D3 and D4 are all positive oil pressure deactivatable hydraulic lash adjusters that can be used to deactivate the operation of the respective valve with which they are associated.

A second non-deactivatable cylinder of the engine 100 has a first exhaust valve (not shown) operated by the hydraulic lash adjuster H1, a second exhaust valve (not shown) operated by the hydraulic lash adjuster H2, a first inlet valve (not shown) operated by the hydraulic lash adjuster H5 and a second inlet valve (not shown) operated by the hydraulic lash adjuster H6.

A third non-deactivatable cylinder of the engine 100 has a first exhaust valve (not shown) operated by the hydraulic lash adjuster H3, a second exhaust valve (not shown) operated by the hydraulic lash adjuster H4, a first inlet valve (not shown) operated by the hydraulic lash adjuster H7 and a second inlet valve (not shown) operated by the hydraulic lash adjuster H8.

The deactivatable and non-deactivatable lash adjusters D1, D2, D3, D4, H1, H2, H3, H4, H5, H6, H7 and H8 are conventional in design and operation and the present application is not limited to any particular design of such devices.

It will be appreciated that the present application is not limited to use with a three cylinder engine having a single deactivatable cylinder and can be advantageously applied for any engine having deactivatable hydraulic lash adjusters.

Figure 4A:
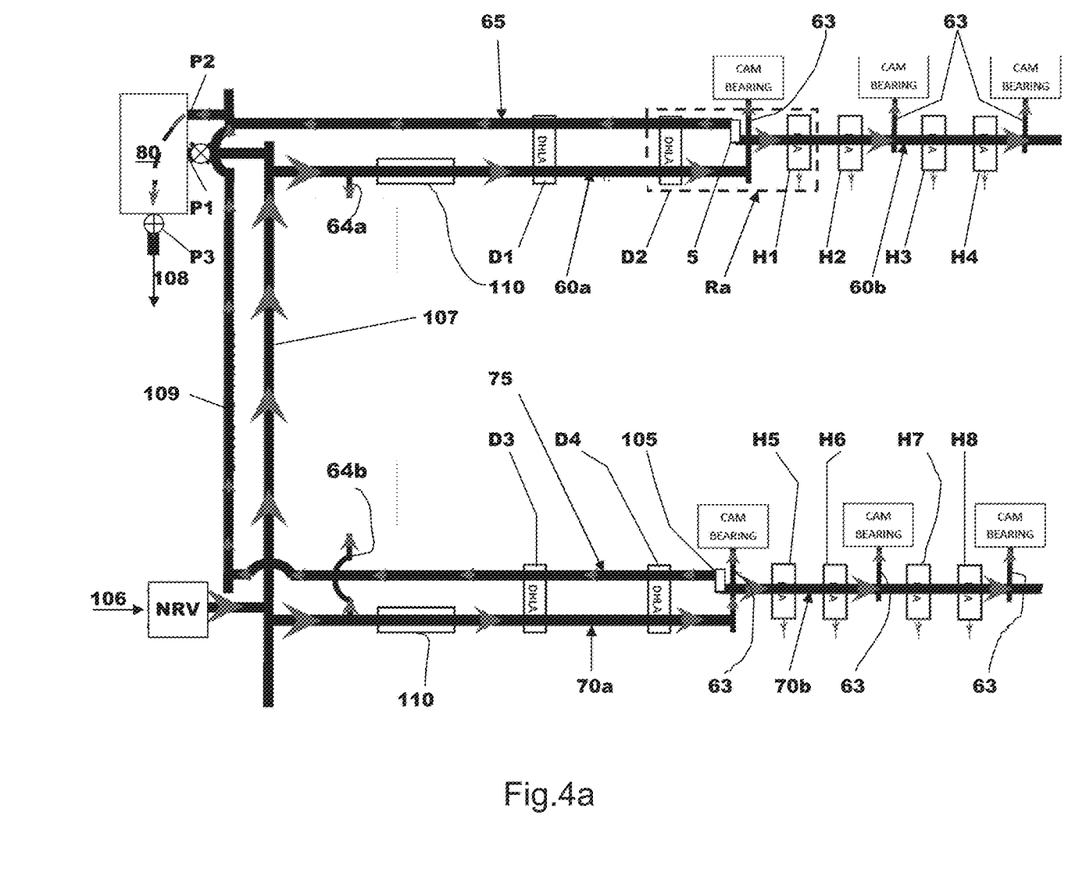
FIG. 4a is a schematic oil flow diagram for the cylinder head of a three cylinder variable displacement (VD) engine showing the direction of oil flow through supply and signal passages in the cylinder head and the position of two combined oil filter and restrictor assemblies in relation to these passages when all of the cylinders are active.
Figure 4B:
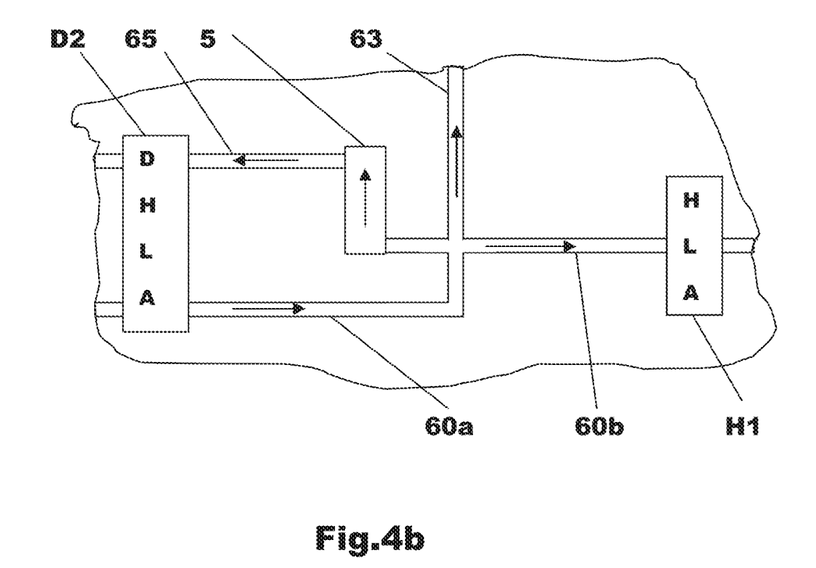

With particular reference to FIGS. 4a and 4b the flow of oil through the cylinder head 50 is shown when none of the cylinders is deactivated.

Oil enters the cylinder head 50 via the direct oil feed 106 from the cylinder block 101 via a non return valve NRV. The oil flows through respective exhaust valve and inlet valve main galleries or oil supply passages 60a, 60b and 70a, 70b formed in the cylinder head 50 to all of the hydraulic lash adjusters D1, D2, D3, D4, H1, H2, H3, H4, H5, H6, H7, H8 and also to a first port P1 of a control valve 80 via an oil passage 107. The control valve 80 has a second port P2 connected to signal oil passages 65, 75 for the deactivatable hydraulic lash adjusters D1, D2 and D3, D4 respectively. A bridging signal oil passage 109 links the two signal oil passages 65, 75 close to the second port P2 of the control valve 80.

A combined oil filter and restrictor assembly such as the combined oil filter and restrictor assembly 5 is located in a cross-bore 51 in the cylinder head 50 so as to link the oil supply passage 60a for the deactivatable hydraulic lash adjusters D1 and D2, the signal oil passage 65 for the deactivatable hydraulic lash adjusters D1 and D2 and the oil supply passage 60b for the hydraulic lash adjusters H1, H2, H3 and H4.

A second combined oil filter and restrictor assembly 105 that is identical to the combined oil filter and restrictor assembly 5 is located in a cross-bore in the cylinder head 50 so as to link the oil supply passage 70a for the deactivatable hydraulic lash adjusters D3 and D4 and the signal oil passage 75 for the deactivatable hydraulic lash adjusters D3 and D4 and the oil supply passage 70b for the hydraulic lash adjusters H5, H6, H7 and H8. In the case of the example shown in FIGS. 4a to 5b the oil supply passage 60a is fluidly connected to the oil supply passage 60b via one of the oil feeds 63 but as shown in FIGS. 6 and 7 this need not be the case.

Figure 5A:
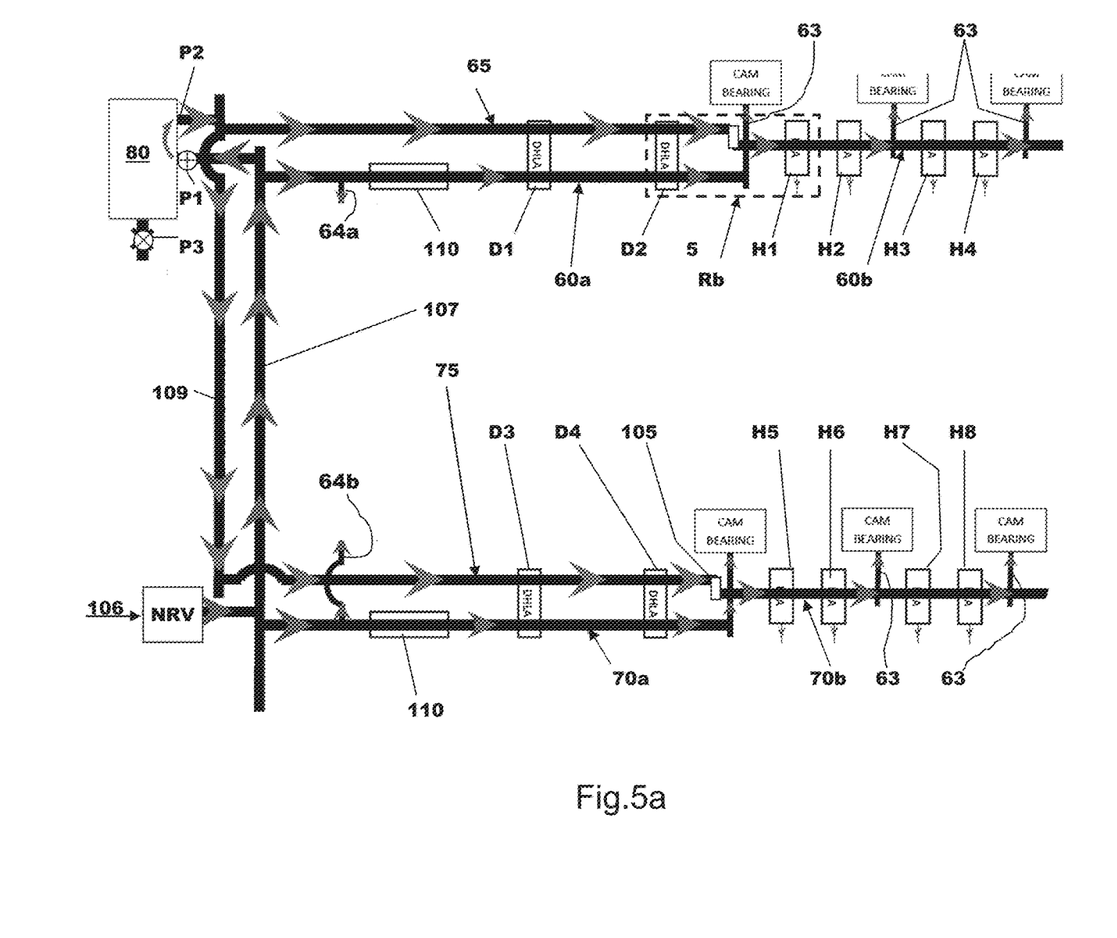
FIG. 5a is a schematic oil flow diagram similar to FIG. 4a showing the direction of oil flow through the supply and signal passages in the cylinder head when one of the cylinders is deactivated.
Figure 6:
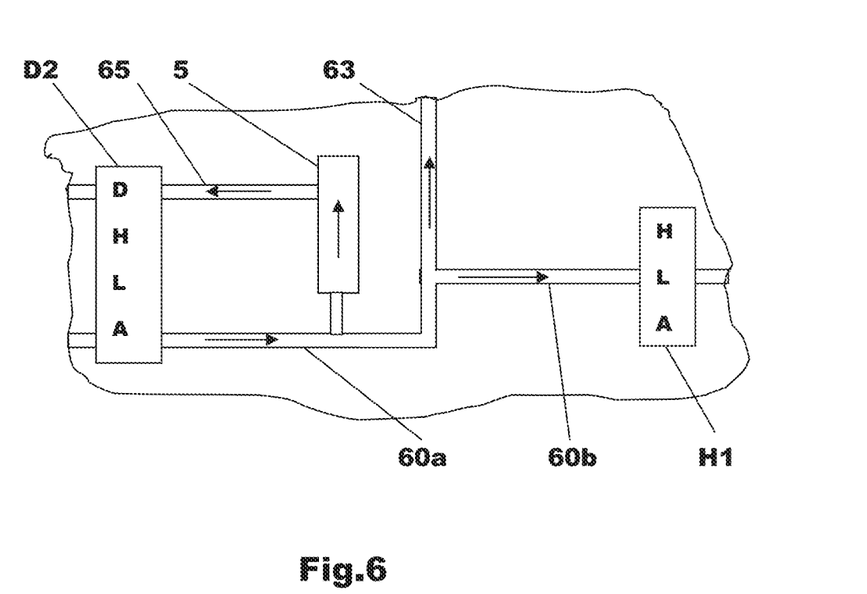
FIGS. 6 and 7 are schematic oil flow diagrams similar to FIG. 4b but showing alternative oil passage arrangements.
Figure 7:
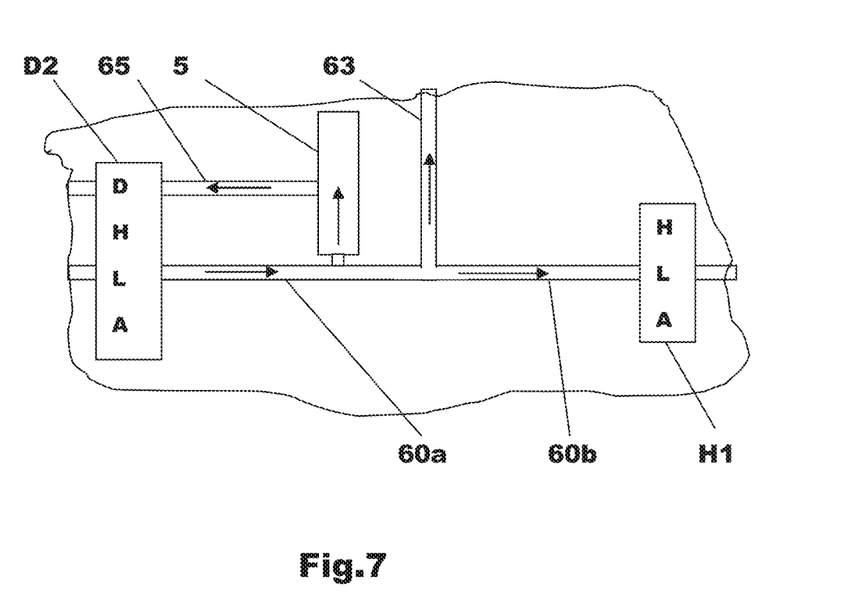

In the case of the example shown in FIGS. 4a and 5a the oil supply passage 70a is fluidly connected to the oil supply passage 70b via one of the oil feeds 63 but this need not be the case and an arrangement similar to that shown in FIG. 6 or FIG. 7 could be used.

The combined oil filter and restrictor assembly 5 fluidly connects the oil supply passages 60a, 60b to the signal oil passage 65 and the combined oil filter and restrictor assembly 105 fluidly connects the oil supply passages 70a, 70b to the signal oil passages 75.

When all of the cylinders of the engine 100 are active none of the deactivatable hydraulic lash adjusters D1, D2, D3 and D4 are deactivated and the control valve 80 is arranged such that no oil can enter the control valve 80 from the oil passage 107 via the first port P1. Therefore in this case oil flows through the oil supply passages 60a, 60b and 70a, 70b to the hydraulic lash adjusters D1, D2, D3, D4, H1, H2, H3, H4, H5, H6, H7, H8 and the cam bearings via the oil feed passages 63.

A small trickle of oil often referred to as 'purge flow' will flow back from the combined oil filter and restrictor assembly 5 to the second port P2 of the control valve 80 via the signal oil passage 65. This trickle of oil primes the deactivatable hydraulic lash adjusters D1 and D2 and purges the signal oil passage 65 of gaseous vapor so that proper operation of the deactivatable hydraulic lash adjusters D1 and D2 is available when needed.

Similarly, a small trickle of oil will flow back from the combined oil filter and restrictor assembly 105 to the second port P2 of the control valve 80 via the signal oil passage 75 and the bridging signal passage 109. This trickle of oil primes the deactivatable hydraulic lash adjusters D3 and D4 and purges the signal oil passage 75 of gaseous vapor so that proper operation of the deactivatable hydraulic lash adjusters D3 and D4 is available when needed.

A third port P3 of the control valve 80 is in this case open so as to allow any oil returning from the signal oil passages 65, 75 and 109 via the second port P2 to leak back to the sump 103 as indicated by the arrow 108 on FIG. 4a.

Therefore, in the situation when the engine 100 has no cylinders deactivated, the flow of oil through the combined oil filter and restrictor assembly 5 is from the oil supply passage 60a via the second filter 42 to the restrictor bore 32 and then out via the first filter 41 into the signal oil passage 65.

A similar flow path applies to the second combined oil filter and restrictor assembly 105 with the oil flowing in from the oil supply passage 70a via a second filter to a restrictor bore and then out via a first filter into the signal oil passage 75.

Figure 5B:
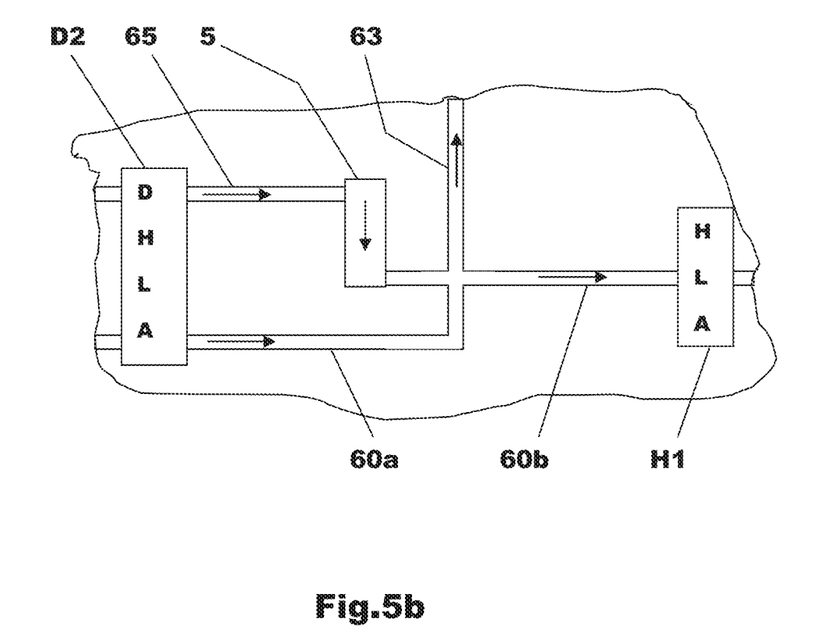

With particular reference to FIGS. 5a and 5b the flow of oil through the cylinder head 50 is shown when one of the cylinders is deactivated.

Oil enters the cylinder head 50 via the direct oil feed 106 from the cylinder block 101 via a non return valve NRV. The oil flows through respective exhaust valve and inlet valve main galleries or oil supply passages 60a, 60b and 70a, 70b formed in the cylinder head 50 to all of the hydraulic lash adjusters D1, D2, D3, D4, H1, H2, H3, H4, H5, H6, H7 and H8 and also to the first port P1 of the control valve 80 via the oil passage 107.

The first port P1 of the control valve 80 is in this case open and the second port P2 is also open so as to connect the flow of oil in the oil passage 107 via the control valve 80 to the signal oil supply passages 65, 75 for the deactivatable hydraulic lash adjusters D1, D2 and D3, D4 respectively. The bridging signal passage 109 transfers oil from the second port P2 of the control valve 80 to the signal oil passage 75 and also links the two signal oil passages 65, 75 close to the second port P2 of the control valve 80.

The third port P3 of the control valve 80 is in this case closed so that no oil can leak back from the control valve 80. It will be appreciated that oil will be able to leak back or return via the cam bearings, variable cam timing unit, the hydraulic lash adjusters H1, H2, H3, H4, H5, H6, H7 and H8 and other components provided with oil via the oil supply passages 60, 60b; 70a, 70b.

As before the combined oil filter and restrictor assembly 5 is located in the cross-bore 51 in the cylinder head 50 so as to bridge between the signal oil passage 65 for the deactivatable hydraulic lash adjusters D1 and D2 and the oil supply passage 60a for the deactivatable hydraulic lash adjusters D1 and D2 and between the signal oil passage 65 and the oil supply passage 60b for the hydraulic lash adjusters H1, H2, H3 and H4.

The second combined oil filter and restrictor assembly 105 is similarly located in a cross-bore in the cylinder head 50 so as to bridge between the signal oil passage 75 for the deactivatable hydraulic lash adjusters D3 and D4 and the oil supply passage 70a for the deactivatable hydraulic lash adjusters D3 and D4 and between the signal oil passage 75 and the oil supply passage 70b for the hydraulic lash adjusters H5, H6, H7 and H8.

The oil supply passages 60a, 70a are therefore fluidly connected to the signal oil passages 65, 75 via the combined oil filter and restrictor assemblies 5, 105.

Therefore, when one of the cylinders of the engine 100 is deactivated, the deactivatable hydraulic lash adjusters D1, D2, D3 and D4 are deactivated by the supply of oil at pressure via the signal oil passages 65, 75. The oil entering the control valve 80 from the oil passage 107 via the first port P1 and exiting via the second port P2 into the signal oil passages 65, 75.

The oil therefore flows through the oil supply passages 60a, 60b and 70a, 70b to the hydraulic lash adjusters D1, D2, D3, D4, H1, H2, H3, H4, H5, H6, H7, H8 and the cam bearings via the passages 63 and also flows via the signal oil passages 65, 75 to the deactivatable hydraulic lash adjusters D1, D2, D3 and D4 thereby deactivating them and the exhaust and inlet valves with which they are associated.

A limited amount of oil will flow through the combined oil filter and restrictor assembly 5 from the signal oil passage 65 to the oil supply passage 60b and similarly, there is a limited flow of oil through the combined oil filter and restrictor assembly 105 from the signal oil passage 75 to the oil supply passage 70b. This flow is primarily due to the presence of flow restrictors 110 in the oil supply passages 60a and 70a upstream from the deactivatable hydraulic lash adjusters D1, D2 and D3, D4 respectively.

When used in such an application when the engine 100 has a cylinder deactivated, the flow of oil through the combined oil filter and restrictor assembly 5 is in from the oil signal passage 65 via the first filter 41 to the restrictor bore 32 and then out via the second filter 42 into the oil supply passage 60b.

A similar flow path applies to the second combined oil filter and restrictor assembly 105 with the oil flowing in from the oil signal passage 75 via a first filter to a restrictor bore and then out via a second filter into the oil supply passage 70b.

Therefore in such application the combined oil filter and restrictor assemblies 5, 105 will be subject to bidirectional oil flow depending upon whether a cylinder is deactivated or not. However, irrespective of the direction of oil flow no oil can enter the restrictor bore 32 without first passing through one of the filters 41, 42.

Figure 3:
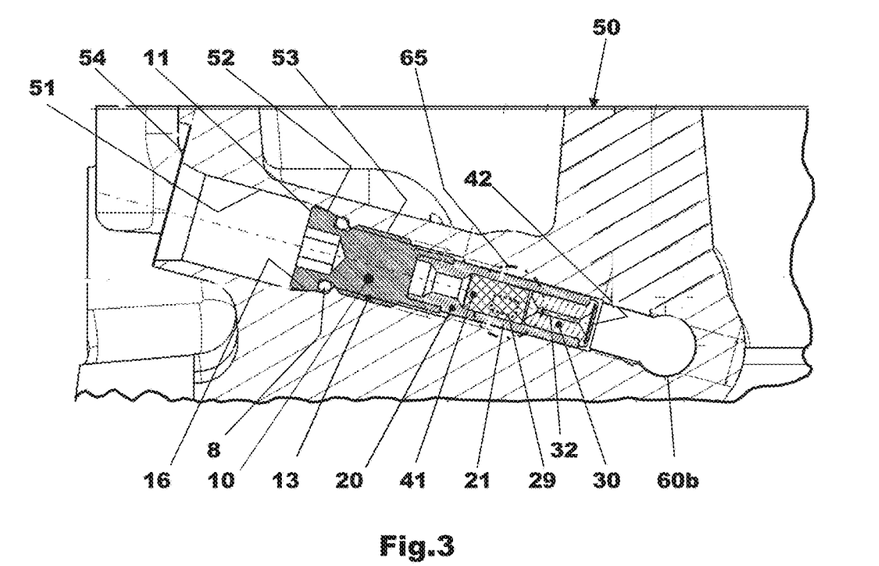
FIG. 3 is a partial cross section through a structural metal component in the form of a cylinder head in accordance with a second aspect of the present application showing a combined oil filter and restrictor assembly fitted in a bore in the cylinder head.

With particular reference to FIG. 3 there is shown a structural metal component in the form of the cylinder head 50 of the engine 100. As previously described the cylinder head 50 defines several oil passages including the signal oil passage 65 and the oil supply passage 60*b* and has a threaded cross bore 51 joining in this case the signal oil passage 65 to the oil supply passage 60*b*.

The cross bore 51 extends inwardly from a side face 54 of the cylinder head 50 and is a stepped cross bore 51 in which is threadingly engaged the combined oil filter and restrictor assembly 5.

The cross-bore 51 has a tapered portion 52 for cooperation with the frusto-conical surface 16 on the head portion 11 of the metal threaded member 10 which in this case is in the form of a steel threaded member 10. It will however be appreciated that the threaded member 10 could be made from other types of metal depending upon the metal from which the cylinder head 50 is made. The interaction of the frusto-conical surface 16 with the tapered portion 53 of the cross bore 51 provides a secondary mechanical seal between the combined oil filter and restrictor assembly 5 and the cylinder head 50. A primary mechanical seal is provided by the 'O' ring 8 that is interposed between the head portion 11 and the cross bore 51. In addition to these primary and secondary mechanical seals the circumferential ribs 28 on the tubular body 21 are sized so as to produce a push fit in the corresponding part of the cross bore 51 so as to restrict axial flow of oil along an outer surface of the tubular body 21. As previously mentioned instead of using ribs on the outer surface of the tubular body 21 the outer surface could simply be sized to produce an interference fit in the cooperating part of the cross bore 51.

A threaded portion 53 of the cross bore 51 defines a female thread with which the male thread 13 on the threaded body portion 12 is engaged to secure the combined oil filter and restrictor assembly 5 in the cross bore 51 of the cylinder head 50.

A fluid connection is provided between the signal oil passage 65 (shown in dotted outline) and the oil supply passage 60*b* via the small diameter bore 32 in the restrictor 30. Due to the presence of the first and second filters 41 and 42 any oil passing through the small diameter bore 32 between the signal oil passage 65 and the oil supply passage 60*b* or vice-versa has to pass through one of the filters 41, 42 irrespective of the direction of oil flow through the small diameter bore 32.

Because only mechanical seals are used and the fact that a threaded connection is used to secure the combined oil filter and restrictor assembly 5 in position it is a simple operation to install or remove the combined oil filter and restrictor assembly 5 from the cylinder head 50.

Not only does this screw attachment enable the combined oil filter and restrictor assembly 5 to be assembled to the cylinder head 50 in a quick and economical manner using conventional production assembly equipment it also allows the combined oil filter and restrictor assembly 5 to be removed if required at a later date for cleaning or replacement.

By using a plastic material for the tubular body 21 the filter and restrictor unit 20 can be made in an economical manner.

The combination of a metal threaded member 10 and a plastic tubular body 21 is advantageous in that it enables the combined oil filter and restrictor assembly to be easily and quickly assembled to the cylinder head 50 or other structural component using conventional production tools without risking damage to the filter and restrictor unit 20.

Therefore in summary, the present application provides a combined oil filter and restrictor assembly that can be fitted into a cross-gallery bore in a cylinder head or other structural component having dual oil galleries.

The combined oil filter and restrictor assembly comprises in general terms comprises an assembly of five main components:—an ISO port type metallic sealing body with an O-ring, a tubular body made from a plastics material such as Nylon to fit with interference in the cross-gallery bore via a smooth or ribbed external surface, a restrictor part and a combination of cylindrical and axial filters located one on either side of the restrictor part.

One embodiment uses a metal threaded part with taper and O-ring sealing to the environment and a non-metallic tubular body to house a cylindrical filter mesh and the restrictor part. An axial seal is held in place by a restrictor part having an orifice or small diameter bore. A tubular plastic body provides a seal with the inter-gallery passage or cross-gallery bore so as to avoid oil bypassing the restrictor part. The metal and plastic parts are connected together using one of a snap-fit joint, an interference joint and a bonded joint.

Due to this construction, the combined oil filter and restrictor assembly can be inserted into the cross-gallery bore and then be run-down during assembly using standard assembly facilities which makes assembly and servicing very convenient.

It is desirable to use a restrictor having a long bore length in order to promote optimal laminar flow through the restrictor. With purely laminar flow the pressure drop is manly a function of oil viscosity. By using a very long orifice, the cross-section (bore diameter) can be increased while facilitating laminar flow. The use of a larger diameter bore is advantageous as it presents a lower risk of clogging.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one example a method of operation may be provided for an engine, wherein when all of the cylinders of the VD-engine are active, the combined oil filter and restrictor assembly permits a restricted purge flow of oil to flow from an oil supply passage for the at least one deactivatable hydraulic lash adjuster to a signal oil passage for the at least one deactivatable hydraulic lash adjuster so as to purge the signal oil passage.

Although the invention has been described with respect to a particularly advantageous use of a combined oil filter and restrictor assembly in a cylinder head of a variable displacement engine it will be appreciated that a combined oil filter and restrictor assembly constructed in accordance with this invention could be used in other applications where a restricted and filtered oil supply is required.

It will be appreciated by those skilled in the art that, although the invention has been described by way of example with reference to one or more embodiments, it is not limited to the disclosed embodiments and that alternative embodiments could be constructed without departing from the scope of the invention as defined by the appended claims.

The invention claimed is:

1. A combined oil filter and restrictor assembly comprising a filter and restrictor unit and a metal threaded member for sealingly retaining the filter and restrictor unit in position, wherein the filter and restrictor unit comprises a tubular body having a cylindrical side wall defining at least one primary oil access port located in the cylindrical side wall at a position spaced away from a first end of the tubular body, an oil flow restrictor located in a primary bore defined by a portion of the cylindrical side wall of the tubular body, a first filter located between a first end of the oil flow restrictor and the at least one primary oil access port and a second filter located between a second oil access port and a second end of the oil flow restrictor such that the oil flow restrictor is interposed between the first and second filters, wherein the second oil access port is arranged to hold the second oil filter in position.

2. The combined oil filter and restrictor assembly as claimed in claim 1, wherein the oil flow restrictor comprises a restrictor body defining a small diameter bore and the restrictor body is located in the primary bore.

3. The combined oil filter and restrictor assembly as claimed in claim 2, wherein the second filter is secured in position by the restrictor body.

4. The combined oil filter and restrictor assembly as claimed in claim 3, wherein an end portion of the tubular body is engaged with a bore in an end portion of the threaded member so as to attach the tubular body to the threaded member.

5. The combined oil filter and restrictor assembly as claimed in claim 4, wherein the tubular body is made from a plastics material.

6. The combined oil filter and restrictor assembly as claimed in claim 5, wherein the threaded member has a head portion and a threaded body portion separated from the head portion by a circumferential groove for accommodating, in use, a resilient seal.

7. The combined oil filter and restrictor assembly as claimed in claim 6, wherein the head portion has a frusto-conical surface thereon for providing a secondary seal between the head portion and a bore in a component with which the threaded member is threadingly engaged in use.

8. The combined oil filter and restrictor assembly as claimed in claim 7, wherein the head portion has a drive means for use in securing the combined oil filter and restrictor assembly in position.

9. The combined oil filter and restrictor assembly as claimed in claim 1, wherein the first filter comprises a cylindrical filter element positioned within the tubular body so as to overlay the at least one primary oil access port, and wherein the cylindrical filter element provides for filtration of oil.

10. An assembly comprising a structural metal component and the combined oil filter and restrictor assembly as claimed in claim 1 wherein the structural metal component defines at least two oil passages and a threaded cross bore joining a first oil passage of the at least two oil passages to a second one of the at least two oil passages, the metal threaded member of the combined oil filter and restrictor assembly is threadingly engaged with the threaded cross bore, the first oil passage is arranged to be in fluid communication with the at least one primary oil access port of the combined oil filter and restrictor assembly and the second one of the at least two oil passages is arranged to be in fluid communication with the second oil access port of the combined oil filter and restrictor assembly.

11. The assembly as claimed in claim 10, wherein the threaded cross bore includes a tapered portion for cooperation with a frusto-conical surface on a head portion of the threaded member so as to form a seal therebetween.

12. The assembly as claimed in claim 11, wherein the tubular body has at least one external circumferential rib thereon for sealing engagement with the threaded cross bore in the structural metal component.

13. The assembly as claimed in claim 12, wherein the structural metal component is a cylinder head of an engine.

14. A method, comprising:
operating a variable-displacement-engine having a deactivatable hydraulic lash adjuster and a combined oil filter and restrictor assembly having a filter and restrictor unit having a tubular body with a cylindrical side wall defining a primary oil access port spaced away from a first end of the tubular body, an oil flow restrictor located in a primary bore defined by a portion of the cylindrical side wall of the tubular body, a first filter located between a first end of the oil flow restrictor and the primary oil access port and a second filter located between a second oil access port and a second end of the flow restrictor, wherein the second oil access port is arranged to hold the second oil filter in position, and where the oil flow restrictor is arranged between the primary oil access port and the second oil access port, where the combined oil filter and restrictor unit permits a restricted purge flow of oil to flow from an oil supply passage for the deactivatable hydraulic lash adjuster to a signal oil passage.

15. The method of claim 14, further comprising purging the signal oil passage, the signal oil passage being for the deactivatable hydraulic lash adjuster, wherein the first and second filters provide for filtration of oil.

* * * * *